(12) United States Patent
Vitali et al.

(10) Patent No.: US 7,742,521 B2
(45) Date of Patent: Jun. 22, 2010

(54) METHOD AND SYSTEM FOR PROCESSING SIGNALS VIA PERCEPTIVE VECTORIAL QUANTIZATION, COMPUTER PROGRAM PRODUCT THEREFOR

(75) Inventors: Andrea Lorenzo Vitali, Bergamo (IT); Luigi Della Torre, Lissone (IT); Sebastiano Battiato, Acicatena (IT); Antonio Buemi, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1248 days.

(21) Appl. No.: 10/674,903

(22) Filed: Sep. 30, 2003

(65) Prior Publication Data

US 2004/0120594 A1 Jun. 24, 2004

(30) Foreign Application Priority Data

Oct. 4, 2002 (EP) .................................. 02425601

(51) Int. Cl.
*H04N 7/12* (2006.01)
*H04N 11/02* (2006.01)

(52) U.S. Cl. .............................. 375/240.03; 375/240.26
(58) Field of Classification Search ............ 375/240.02, 375/240.03; 382/239, 251
See application file for complete search history.

(56) References Cited

U.S. PATENT DOCUMENTS

| | | | |
|---|---|---|---|
| 5,054,025 A | 10/1991 | Galand et al. | |
| 5,193,003 A | 3/1993 | Kondo | |
| 5,214,507 A * | 5/1993 | Aravind et al. | 348/390.1 |
| 5,341,441 A * | 8/1994 | Maeda et al. | 382/253 |
| 5,731,836 A * | 3/1998 | Lee | 375/240.16 |
| 5,764,803 A | 6/1998 | Jacquin et al. | 382/236 |
| 5,835,144 A * | 11/1998 | Matsumura et al. | 375/240.23 |
| 6,363,113 B1 * | 3/2002 | Faryar et al. | 375/240.03 |
| 6,385,245 B1 * | 5/2002 | De Haan et al. | 375/240.16 |
| 6,463,100 B1 * | 10/2002 | Cho et al. | 375/240.03 |
| 6,625,219 B1 * | 9/2003 | Stopler | 375/240.27 |

OTHER PUBLICATIONS

'Sequential scalar quantization of vectors: an analysis', Balasubramanian et al., Image Processing, IEEE Transactions on vol. 4, Issue 9, Sep. 1995 pp. 1282-1295, Digital Object Identifier 10.1109/83.413172.*

Chun, K. et al., "An Adaptive Perceptual Quantization Algorithm for Video Coding," *IEEE Transactions on Consumer Electronics* 39(3):555-558, Jun. 1993.

Höntsch, I. et al., "Locally Adaptive Perceptual Image Coding," *IEEE Transactions on Image Processing* 9(9):1472-1483, Sep. 2000.

Jayant, N. et al., "Signal Compression Based on Models of Human Perception," *in Proceedings of the IEEE*, New York, Oct. 1, 1993, vol. 81, No. 10, pp. 1385-1421.

Rec. ITU-R BT.601-5, "Studio Encoding Parameters of Digital Television for Standard 4:3 and Wide-Screen 16:9 Aspect Ratios", 1995, 15 pages.

* cited by examiner

*Primary Examiner*—David Czekaj
(74) *Attorney, Agent, or Firm*—Lisa K. Jorgenson; Timothy L. Boller; Seed IP Law Group PLLC

(57) ABSTRACT

The system carries out conversion of digital video signals organized in blocks of pixels from a first format to a second format. The second format is a format compressed via vector quantization. The vector quantization is performed by means of repeated application of a scalar quantizer to the pixels of said blocks with a quantization step (Q) determined in an adaptive way according to the characteristics of sharpness and/or brightness of the pixels.

61 Claims, 5 Drawing Sheets

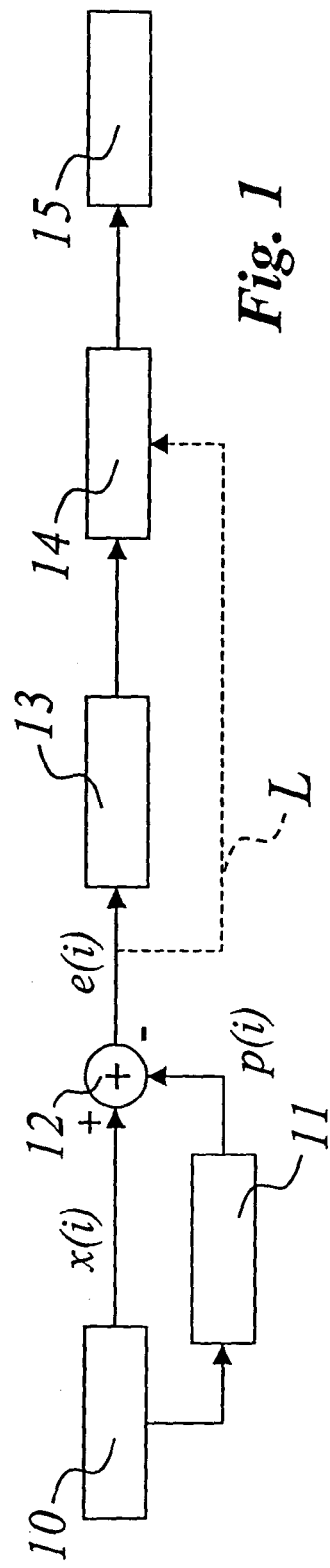
*Fig. 1*
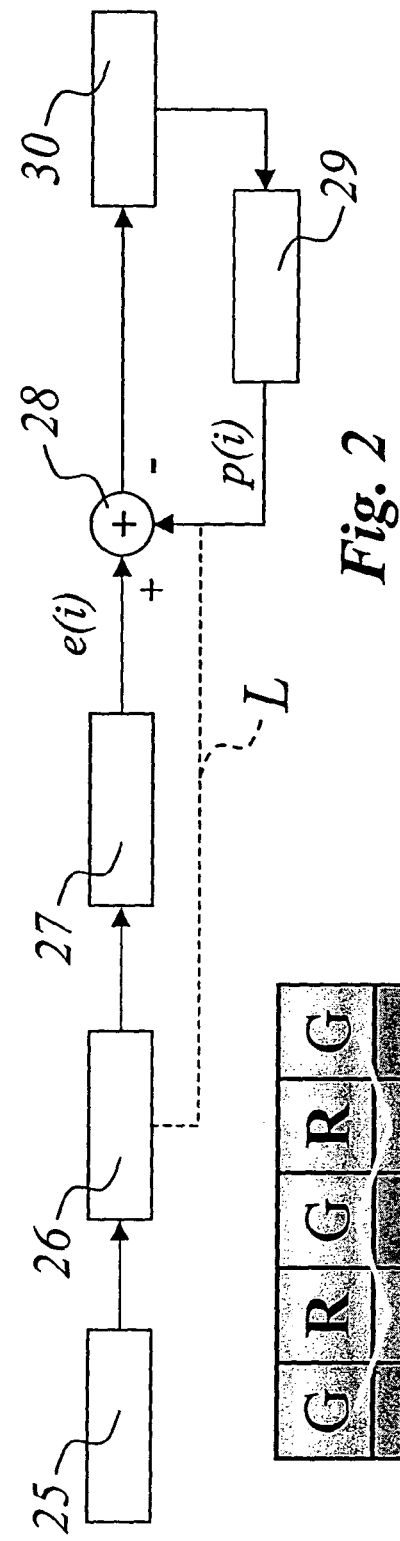
*Fig. 2*
*Fig. 3*

METHOD AND SYSTEM FOR PROCESSING SIGNALS VIA PERCEPTIVE VECTORIAL QUANTIZATION, COMPUTER PROGRAM PRODUCT THEREFOR

BACKGROUND OF THE INVENTION

1. Field of the Invention

The present disclosure relates generally to techniques for signal processing and has been developed with particular but not exclusive attention paid to possible applications in the framework of systems which envisage reduction in the quantity of data required for representing, in a digital format, an image (still picture) or a sequence of images (video sequence).

2. Description of the Related Art

Known to the art are various solutions for efficient compression of digital images. These solutions are usually characterized by a high computational complexity and are not easily integratable in the solutions commonly referred to as System on a Chip (SoC).

The techniques of compression of digital images can be classified in two fundamental groups.

A first group comprises the so-called lossless compression techniques i.e., techniques without loss of quality, which can be used also for processing other types of digital data. The purpose of this type of compression is to remove the statistical redundancy of the data.

To each digital datum there is assigned a variable number of bits, which depends upon the statistical frequency of the particular datum in question.

With reference, by way of example, to the so-called Huffmann compression, to each digital datum there is assigned a variable integer number of bits according to the following rule: short binary codes are assigned to the more frequent data, whereas long binary codes are assigned to less frequent data.

Also known are techniques of arithmetic compression, in which to each digital datum there is assigned a variable and fractional number of bits. The criterion of assignment of the bits is similar to the one used for the Huffmann compression.

Other compression methods are based upon the use of dictionaries. The sequences of the digital data to be compressed are reduced to words of variable length of a dictionary. Corresponding to each word is an appropriate binary code of a fixed or variable length. Belonging in this context is the algorithm for identification of the optimal dictionary due to Lempel and Ziv.

A second group of known compression techniques comprises the lossy compression techniques i.e., techniques with loss of quality.

The purpose of this type of compression is to remove the perceptive redundancy in the data. The image is modified by eliminating what cannot be perceived, or is perceived less, by the human visual system (HVS). The characteristic that is most widely exploited by the visual system amounts to the fact that the sensitivity to low frequencies is higher than the sensitivity to high frequencies. In addition, the perception of the spatial resolution of brightness information is more marked than the perception of chromaticity information.

The representation of the chromaticity information may therefore be less precise, in the sense that the spatial resolution may be lower. The chrominance is, therefore, under-sampled as compared with the brightness. The loss of quality which derives therefrom is practically not perceived by the human eye.

By way of example, for the ITU-R BT.601 standard, the under-sampling ratio between the luminance signal (Y) and the two color differences (CbCr or UV or IQ or DbDr) is 4:2:2. For the well-known MPEG standard the ratio is 4:2:0, where 0 indicates that under-sampling is both vertical and horizontal.

Likewise, the representation of the other sequences may be less precise, in the sense of a coarser quantization, with consequent saving in bits. The loss of perceived quality that derives therefrom is, however, low on account of the lower sensitivity of the visual system to these frequencies.

The splitting into high and low frequencies can be done only after having passed from the spatial domain to the frequency domain by means of the transformation operation. The most widely used transformations are, by way of example, the discrete cosine transform (DCT) and the discrete wavelet transform (DWT).

BRIEF SUMMARY OF THE INVENTION

One embodiment of the present invention provides a solution that is improved as compared to the ones provided by the known art from various standpoints and, in particular, as regards the needs to keep computational complexity (i.e., the number of processing operations and the number of storage units) low with a view to integration of the function of image compression or decompression in a more complex system, without penalizing markedly compression efficiency and, therefore, enabling a reduction in the area occupied on the silicon by the corresponding circuits, with the consequent reduction in production costs, at the same time achieving a reduced dissipation (this latter factor being particularly important for low-power devices).

Another embodiment of the invention also regards the corresponding system, as well as the corresponding computer product, which is directly loadable into the internal memory of a digital processor and contains portions of software code that are able to implement the process when said computer product is run on a numeric processor.

The solution according to an embodiment of the invention can be integrated, for example, both in a digital unit for image acquisition (CCD/CMOS sensors) and in an image-display unit (LCD display). In particular, in the case of digital cameras and similar or related devices, the data are acquired by the sensor according to a spatial pattern known as Bayer color-filter array (CFA), which enables association of just one of the three color components to each pixel. The corresponding RGB image is then reconstructed by means of an image-processing sequence (image-generation pipeline, IGB), among which there is always present a block dedicated to compression.

The fact of anticipating this step, placing it immediately after the acquisition of the data from the sensor, enables a reduction of the band necessary for transmission of the image from the processing unit or storage unit to the display. This solution is useful above all in the case of applications in which the acquired data are to be transmitted for remote processing thereof.

Basically, the solution according to an embodiment of the invention is based upon the construction of a vector or multi-dimensional quantizer with non-uniform quantization cells for digital-data arrays containing (linear or non-linear) chromatic components.

The vector quantizer is built so as to enable the simultaneous reduction of the statistical and perceptive redundancy of the data contained in the array and to minimize the complexity of the encoding (which corresponds to compression) and the decoding (which corresponds to decompression).

BRIEF DESCRIPTION OF THE DRAWINGS

Embodiments of the invention will now be described, purely by way of non-limiting examples, with reference to the annexed drawings, in which:

FIG. 1 illustrates, in the form of a block diagram, the scheme of an encoding circuit operating according to an embodiment of the invention;

FIG. 2 illustrates, once again in the form of a block diagram, the structure of an embodiment of a decoding circuit which can be used in the context of the invention;

FIG. 3 illustrates the scanning diagram of one of the chromatic components (in particular, the green component) of a so-called Bayer pattern, in the context of a system operating according to an embodiment of the invention.

DETAILED DESCRIPTION

Figure 4:
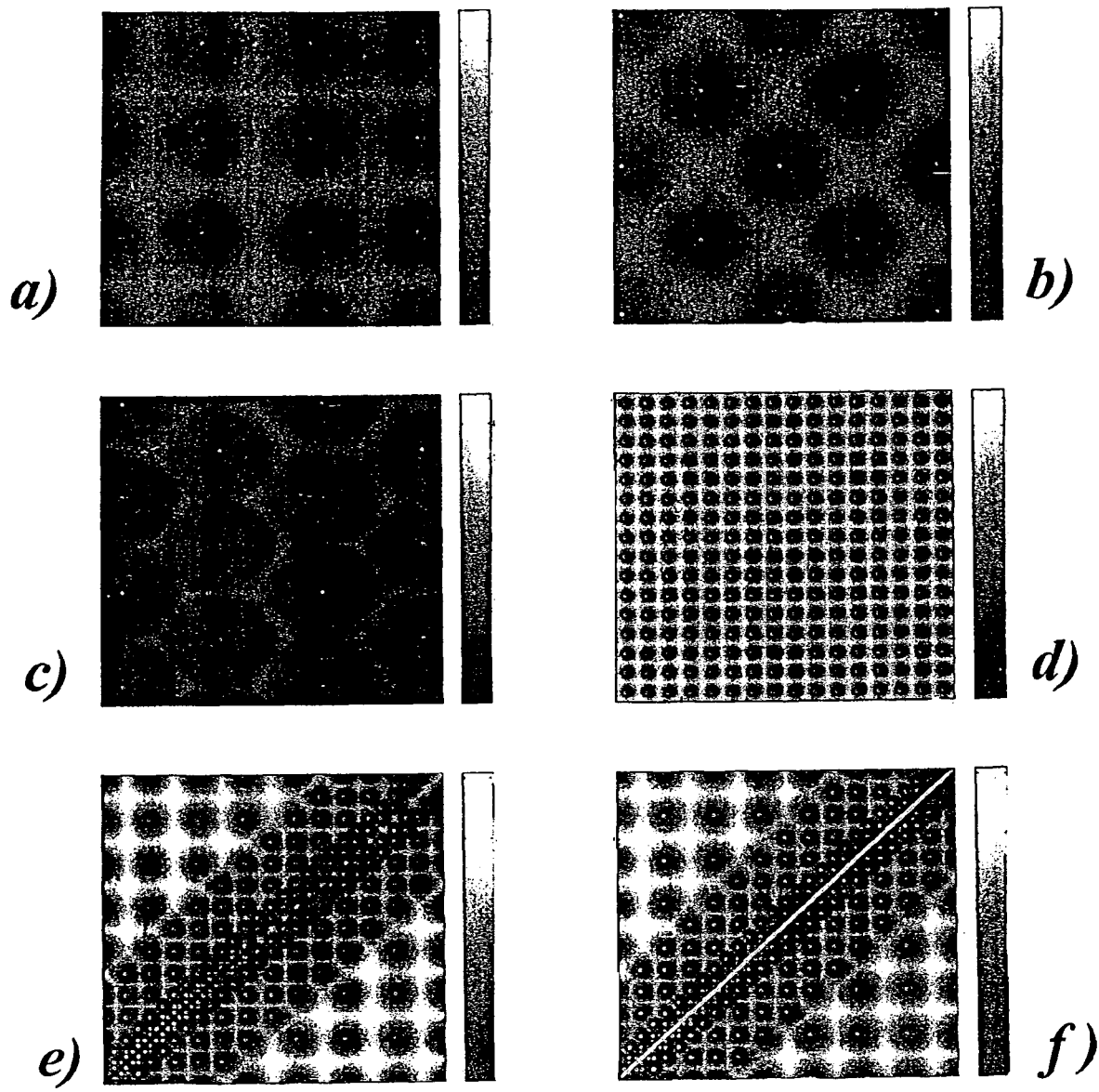
FIGS. 4 to 7 represent various examples of application of the solution according to embodiments of the invention.

Embodiments for processing signals via perceptive vectorial quantization are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

With initial reference to the diagram of FIG. 1, the block designated by 10 represents, as a whole, a sensor (in what follows, the sensor in question will be assumed to be an image sensor of the type commonly referred to as Bayer sensor), which is able to generate at output a signal x(i) representing an image in a digital format.

Sensors of the above type are widely known to the art; therefore, the corresponding operating characteristics, also as regards the characteristics of the signals generated, do not call for a detailed description herein.

The reference number 11 designates, in FIG. 1, a predictor block, which can generate, from the input image generated by the block 10, a corresponding prediction signal p(i). In the example illustrated herein, the prediction signal is generated, for each signal x(i), as a function of the previous value x(i−1).

Consequently, the signal p(i) can be expressed as:

$$p(i)=\text{predictor }(x(i))=x(i-1).$$

The signals x(i) and p(i) are then added (with opposite signs) in a summation node 12, which generates, at its output, a prediction-error signal e(i) that can be expressed in general as:

$$e(i)=x(i)-p(i)$$

with e(1)=x(1).

The reference 13 designates a block in which the prediction-error signal e(i) undergoes quantization and is then subjected, in a block designated by 14, to a symbol-encoding function which lies at the basis of the output image, designated, as a whole, by 15.

The encoding diagram represented, merely by way of example and hence without any intention of limiting the scope of the invention, in FIG. 1 is, therefore, basically of the type commonly referred to as differential PCM (DPCM). The lossy aspect of the encoding is clearly linked to the quantization function implemented in block 13.

The dashed line designated by L indicates that, in the case of a lossless encoding, the prediction errors are not quantized before the encoding carried out in block 14.

The block diagram of FIG. 2 illustrates the complementary decoding function. Here, the input image 25 (comprising a compressed image which can be virtually identified with the image 15 deriving from the encoding action) is supplied to a symbol-(de)coding block 26 and then passes to a (de)quantization block 27 where the prediction-error signal e(i) is reconstructed and is then added with sign, in a node designated by 28, to a prediction signal p(i) generated by a prediction block 29. The above is done in order to generate a signal corresponding to the reconstructed output image represented by block 30.

It will be appreciated that, also in the case of the DPCM decoder of FIG. 2, the prediction block 29 operates according to the value of the reconstructed signal for the preceding instant in time.

In other words, the decoding function represented in the diagram of FIG. 2 corresponds to the implementation of the relation:

$$x(i)=e(i)+p(i)$$

with x(1)=e(1).

Also in the diagram of the decoder illustrated in FIG. 2, the dashed line designated by L shows the possible recourse to lossless decoding techniques, in which the signal at output from the block 26 is sent immediately downstream, by-passing the dequantization block 27.

The diagrams represented in FIGS. 1 and 2 have an altogether general and generic nature and apply to digital image signals of any kind.

The quantization operation represented by block 13 (of course, the same considerations apply, in a complementary way, to the dequantization block 27) envisages that the array of data representing the input signal in the specific case, the prediction error e(i) will be split into blocks of pixels. When the block of pixels contains just one pixel, the quantization technique deriving therefrom is referred to as scalar quantization; otherwise, it is referred to as vector or multi-dimensional quantization.

In order to obtain minimum computational complexity, two pixels per block are preferably chosen. In this case, the quantizer is two-dimensional, i.e., the vector to be quantized has a dimension of 2.

When the number of pixels so enables, the block is preferably square, the aim being not to favor vertical orientation over horizontal orientation, in order to increase compression isotropy.

In the case of image sequences, the three-dimensional block is preferably cubic, for the reasons already illustrated.

The intensity of the pixels contained in the block constitutes an n-tuple of co-ordinates in an n-dimensional space. The n-dimensional space is partitioned into cells, each cell containing a reconstruction point. To each reconstruction point there is assigned an appropriate binary code.

The vector or multi-dimensional quantization operation, which can be implemented in block 13, comprises passing from the binary representation of the intensity of the pixels contained in the block to the binary code assigned to the reconstruction point of the cell, selected on the basis of the pixels themselves.

The simplest vector quantizer is the one comprising a scalar quantizer applied n times to each pixel of the block. The vector quantizer represented here basically comprises a scalar quantizer applied to each pixel in the block with a quantization step calculated in an adaptive way according to the characteristics of the pixels themselves.

The compression technique is, as has been seen, of a lossy type. In fact, the reconstruction point is generally coordinated and different from the point corresponding to the n-tuple of starting co-ordinates. The difference is referred to as quantization error.

As will be illustrated in greater detail in what follows, by appropriately designing the vector quantizer, it is possible to obtain the simultaneous reduction in the statistical redundancy and perceptive redundancy of the data, at the same time maintaining a low computational complexity.

A vector quantizer with uniform cells and variable-length code for the reconstruction points achieves a reduction in the statistical redundancy of the data. This is obtained by assigning short binary codes to the reconstruction points belonging to the cells selected more frequently, in a manner similar to what is done in the Huffmann compression technique.

The vector quantizer with non-uniform cells and fixed-length code for the reconstruction points has asymptotically the same performance in terms of reduction in statistical redundancy if it is built in an appropriate manner. In particular, the areas of the multidimensional space most frequently selected are partitioned with cells that are smaller and nearer to each other.

The compression is due to the fact that the binary representation associated to the reconstruction point requires fewer bits that the binary representation of the elements of the vector to be quantized.

As regards the vector quantizer presented herein, after experimental measurements have been carried out, it is noted that, for an n-dimensional space, the cells must be concentrated along the straight line of equation:

$$x_1 = x_2 = x_3 = \ldots = x_n$$

where $x_i$ is the i-th co-ordinate, with i ranging from 1 to n. It is, in practice, the n-dimensional diagonal.

The experimental measurements are justified by the fact that the outlines or edges constitute a small part of the image. In the rest of the image, the intensity of the pixels of the block is approximately uniform, which means that in the multidimensional space the corresponding co-ordinate is near the straight line represented by the above equation.

It can moreover be noted that, whilst the number of the pixels of the image increases as $N^2$, i.e., as the square of the length of the side (if the image is assumed to be approximately square, with a side of N pixels), the number of pixels of the edges increases only according to N. On the basis of this observation, it is foreseeable that the vector quantizer thus designed proves increasingly efficient as the image resolution increases.

In other words, as the resolution increases, the percentage of edges decreases. The bigger cells, which are far from the n-dimensional diagonal, with greater quantization error, are selected less on a percentage basis. It may be concluded that the signal-to-quantization noise ratio of the image increases.

On the basis of the premises recalled above, it is possible, once more with reference to a non-uniform vector quantization, to refer to reduction in perceptive redundancy.

As has already been said, the human visual system shows a low sensitivity to the high frequencies contained in the image, which can therefore be quantized in a coarser way.

It is possible to exploit in this way the said property of the visual system by passing to the frequency domain by means of a (DCT or DWT) transform of a block of pixels. This operation usually proves rather burdensome in terms of computational complexity.

A simpler way to exploit said property is based upon operation in the spatial domain instead of the frequency domain.

The above is based upon the fundamental idea of quantizing the images in a coarser manner near the edges, where high frequencies are found: it is, in practice, a masking effect which occurs at the edges.

Quantizing in a coarser way means increasing the quantization step. In effect, the quantization step can be the greater, the sharper the edge, and the sharpness of the edge can be measured in different ways.

For example, if the block contains only two pixels (as in a minimum-complexity implementation) the sharpness of the edge is simply the absolute difference of the light intensity of the two pixels. If the block contains more than two pixels, a simple and rapid measurement may be the absolute difference between the highest intensity and the lowest intensity present in the block.

After the sharpness of the edges has been calculated (according to known criteria, on the basis of the premises indicated above), it is quantized so as to divide the edges into a number of classes. For example, in the case of a block of two pixels, $E = abs(p_1 - p_2)$. If $p_1$ and $p_2$ range from 0 to 255, the sharpness of the edge E ranges from 0 to 255. If E is quantized with a step $E_{SQ} = max(E)/3$, its quantized value is $E_Q = round(E/E_{SQ})$, and four classes of edges are obtained, since $E_Q$ ranges from 0 to 3.

Alternatively, it is possible to use a threshold table for classifying E while assigning the values $E_Q$ accordingly.

The class 0 corresponds to the least sharp edge (flat area), the class 3 corresponds to the sharpest edge. The step of quantization of the pixels of the block is chosen the higher, the sharper is the edge.

The quantization step Q can be read from an indicized table according to the edge class $E_Q$. Alternatively, the quantization step Q can be calculated as a function of the parameter $E_Q$.

For example, we can simply set $Q = m*E_Q + q$ with m and q constant values appropriately chosen. Alternatively, and in one embodiment, we can set $Q = m*(t^{E_Q}) + q$. To maintain a low computational complexity, $q=0$ and $t=2$.

More in general, and in an embodiment, the function which enables calculation of Q from $E_Q$ is defined so that the value of Q will be multiplied by an integer value if $E_Q$ increases and will be divided by an integer value if $E_Q$ decreases. This makes it possible to simplify the subsequent calculation of the binary code (block 14 of FIG. 1), to be supplied at output, from the result of the vector quantization (block 13 of FIG. 1).

The vector quantization is then reduced by repeatedly applying a scalar quantizer with a quantization step Q calculated in an adaptive way in order to exploit the effect of masking of the edge. In particular, the intensity of each pixel of the block $p_i$ is quantized as follows: $p_{iQ} = round(p_i/Q)$.

The reconstruction level (for inverting the quantization operation block 27 of FIG. 2) is simply set equal to $p_{iR} = p_{iQ}*Q$.

The set of quantized intensities $p_{iQ}$ of the block is used for gaining access to a table in which a constant-length or variable-length binary code, associated to the construction level previously identified, is specified. In an embodiment, said code is of constant length.

Alternatively, said binary code is derived via binary arithmetic operations from the binary representations of the quantized block intensities appropriately clustered.

It will be appreciated that the resulting vector quantizer has cells more concentrated along the n-dimensional diagonal. A simultaneous reduction in statistical redundancy and in perceptive redundancy is thus achieved.

A further property of the human visual system is the lower sensitivity as brightness increases. This property is already exploited well by the exponential relation which relates the linear chromatic components to the corrected non-linear ones, with the use of the so-called gamma factor.

The corrected components are the ones normally used. It is experimentally found that said corrected components still in part present the aforementioned perceptive redundancy.

In particular, the mean value M of brightness of the pixels in the block is calculated. This level is quantized with a step $M_{SQ}$ so as to divide the blocks into a number of classes: $M_Q$=round ($M/M_{SQ}$). If, for example, $M_{SQ}$=max (M)/2, $M_Q$ may assume the values 0, 1, or 2.

Alternatively, it is possible to use a threshold table for appropriately classifying M, accordingly assigning the values $M_Q$.

The quantization step Q may be increased or decreased by an amount proportional to $M_Q$ via an appropriate constant, thus exploiting the effect of masking of the high light intensity.

Alternatively, it is possible to use a table to derive Q from $M_Q$. It is also possible to calculate Q directly from $E_Q$ and $M_Q$ taken together by means of an appropriate formula or table, the latter usually implemented in the form of a so-called look-up table (LUT).

As has been mentioned previously, the function that enables calculation of Q from $E_Q$ is preferably such that the value of Q will be multiplied by an integer value if $M_Q$ increases and will be divided by an integer value if $M_Q$ decreases.

The resulting vector quantizer, derived from the previous one, has cells more concentrated along the n-dimensional diagonal ($x_1=x_2=x_3=\ldots=x_n$). In particular, the concentration is higher at the beginning of the diagonal ($x_1=x_2=x_3=\ldots=x_n=c$, with c small) and lower at the end ($x_1=x_2=x_3=\ldots=x_n=c$, with c large).

The vector quantizer thus far described consists in a scalar quantizer applied to each element of the vector to be quantized. The quantization step is identical for all the elements of the vector and is calculated according to the perceptive characteristics of the vector itself: sharpness of the edge, if present, and mean brightness.

The reconstruction points of this vector quantizer are arranged according to an orthogonal lattice, having square cells, in the two-dimensional case, or cubic cells, in the three-dimensional case.

For the two-dimensional case, it is known that the optimal lattice, with cells all the same as one another, is the one with hexagonal cells. The reason is that the maximum quantization error is due to the point which, in the cell, is further away from the reconstruction point. The ideal cell is consequently the circular cell, and the hexagonal cell is the one that best approximates the ideal cell whilst covering completely the space to be quantized.

The quantizer with hexagonal cells can be obtained from a quantizer with rectangular cells, in which the reconstruction points have co-ordinates that increase with a step DX=(3/2)*L, DY=sin ($\pi$/3)*L, with pre-set L calculated in the way already described for the quantization step. The reconstruction points of the rectangular lattice have co-ordinates X=n*DX, Y=m*DY, with n and m integers. The reconstruction points of the hexagonal lattice are a sub-set of these and precisely are the points where o=m+n is even (or else odd).

Alternatively, and in one embodiment, the cell is square. In this case DX=DY=L, with pre-set L calculated in the way already described for the quantization step. If only the reconstruction points where o=m+n is even (or else odd) are considered, a square lattice rotated through 45° is obtained, hence a lattice which basically amounts to a quincunx configuration.

Alternatively, it is possible to use a lattice with hexagonal cells rotated through 45°, in order to align one of the borders of the cells to the n-dimensional diagonal according to which the space to be quantized is partitioned.

The vector quantizer thus far described obtained with a scalar quantizer applied n times (one for each pixel of the block of the image), for which the quantization step Q is calculated in an adaptive way according to the sharpness E of the edge present in the block and according to the mean light intensity M thereof. In this way, the simultaneous reduction of the statistical and perceptive redundancy is obtained.

Such a quantizer can be applied to pixel arrays corresponding to the luminance, the chrominance, or to a given color (R, G, or B).

In the case of chromatic components under-sampled (as in the case of video signals in the formats YUV, YIQ or YDbDr in the 4:2:2 format) and multiplexed (as in the case of the digital video signal YCbCr ITU-R BT.601), the block of pixels must be appropriately treated, re-ordering and demultiplexing the components to which the vector quantizer is to be applied.

For example, considering a pair of 8-bit pixels corresponding to the same chromatic component, this is replaced by an 8-bit index which identifies one of the reconstruction points which are concentrated about the two-dimensional diagonal. The compression factor is, in this case, 2:1. It is evident that, if 8 bits are used, i.e., $2^8$=256 cells in the two-dimensional space corresponding to each pair of pixels. A particular case is represented by data organized according to a so-called Bayer pattern (see in this regard FIG. 3, which refers to a scanning diagram of the green component of the Bayer pattern for an adaptive DPCM encoding/decoding system).

The data in Bayer format obviously represent an approximation of the chromatic components of a scene that can be acquired by a digital sensor. The final quality of the image is strictly linked to the color reconstruction/interpolation algorithms. When the aim is to implement a compression function it is, however, important, in the case of a lossy compression, to attempt to preserve a high fidelity with respect to the original data. Small alterations could, in fact, alter/worsen the quality of the final RGB image with effects such as false colors, a so-called diffused aliasing, etc. It is thus important to use techniques that take into account the particular structure, exploiting precisely the chromatic correlation of the different channels.

Following, in fact, a global approach of a traditional type (for example, JPEG), the transitions between pixels of different colors would be encoded as high-frequency and consequently markedly altered components. On the other hand, in the case of low-cost applications, the technique must necessarily exploit just a few computational resources, remote reconstruction being envisaged.

In the case of an array containing a Bayer pattern, the block of dimensions 4×2 contains the following scheme of chromatic components:
  row 1=$G_1 R_1 G_2 R_2$,
  row 2=$B_1 G_3 B_2 G_4$;
using the two-dimensional vector quantizer, the pairs to which said quantizer can be applied are $<R_1, R_2>$, $<B_1, B_2>$ together with $<G_1, G_2>$, $<G_3, G_4>$ or $<G_1, G_3>$, $<G_2, G_4>$.

It is experimentally observed that, if $<G_1, G_2>$, $<G_3, G_4>$ are vector quantized, the quality improves. In fact, in the other case, the pixels that belong to a pair are more distant from one another, and it is less likely for them to have similar intensities, i.e., it is less likely that the point of corresponding co-ordinates is near the diagonal where the quantization is finer and the error smaller.

In the case of images in RGB format, it is usually convenient to perform a change of co-ordinates to the color space YCbCr (or else to any of the similar spaces in which the luminance information is separate from the chrominance information, i.e., YUV, YIQ or YDbDr).

For a general review of the characteristics of said chromatic spaces, as well as the other chromatic spaces to which reference is made in the framework of the present description, useful reference may be made to the following documents:
  R. C. Gonzales, R. E. Woods, *Digital Image Processing*, Addison Wesley, 1993;
  W. B. Pennebaker, J. L. Mitchell, *JPEG, still image data compression standard*, Van Nostrand Reinhold, 1992; and
  D. Taubman, M. Marcellin, JPEG2000*Image Compression Fundamentals*, The Kluwer Int. Series in Eng. and Computer Science, Volume 642 Hardbound, ISBN 0-7923-7519-X, November 2001).

The chrominance planes are then sub-sampled horizontally (4:2:2 format), or else both horizontally and vertically (4:2:0 format). Possibly, the operation of sub-sampling can be preceded by a low-pass filtering for reducing the aliasing effects, above all in the case of non-progressive multiplexed video material.

The luminance plane is then compressed by applying the two-dimensional vector quantizer to (horizontally or vertically) adjacent pairs of pixels. For example, from row=$Y_1 Y_2 Y_3 Y_4$, we move onto the pairs $<Y_1, Y_2>$ and $<Y_3, Y_4>$, which are then vector quantized. The chrominance planes are processed in a similar way but separately. Alternatively, and in another embodiment, sub-sampling of the chrominance planes is performed according to a quincunx (i.e., checkerboard) configuration, proceeding so that the two chrominance planes can be multiplexed perfectly: row 1=$U_1 V_1 U_2 V_2$, row 2=$V_3 U_3 V_4 U_4$. The vector quantization is then to be applied to the pairs $<U_1, U_3>$, $<U_2, U_4>$ and $<V_1, V_3>$, $<V_2, V_4>$.

Alternatively, but with a slightly lower quality, the following pairs can be used: $<U_1, U_2>$, $<U_3, U_4>$ and $<V_1, V_2>$, $<V_3, V_4>$. The poorer quality is due to the greater spatial distance between the pixels of the pairs, which renders more likely a lower correlation. The pair to be vector quantized is consequently located far away from the multi-dimensional diagonal and is quantized with a higher quantization error.

The above checkerboard sub-sampling lattice proves to be more isotropic as compared to the 4:2:2 case, in so far as it does not give preference to the horizontal edges. In addition, perfect multiplexing between the components causes a chrominance component always to be associated to each luminance pixel, instead of having alternately pixels for which the set YUV is specified and pixels for which only the value Y is specified. This enables a reduction of the artifacts due to the subsequent step of interpolation and reconstruction of the original RGB image.

As has been seen, vector quantization of multiplexed chromatic components is obtained by grouping each component in the block into a vector of appropriate size and quantizing it separately. In an embodiment, the vector has a minimum size of 2.

If the aim is to decompress the image, the binary code in the reconstruction point (supplied at output from block 26 of FIG. 2) must be replaced with the co-ordinates of the point itself. In the case of sub-sampled and multiplexed chromatic components, it is then necessary to separate the components (demultiplexing) and interpolate.

It is experimentally found that the vector-quantization error gives rise to visible colored patterns. This occurs above all in the uniform areas of the image. The cause is to be chiefly attributed to the interpolation method which necessarily makes use of adjacent pixels that are of the same chromatic component but are affected by repeated and regular quantization error.

A possible solution of the problem involves trying to introduce the so-called dithering in order to brake the regularity of the quantization error.

In practice, a (low) level of noise is intentionally added so as to prevent the colored pattern. The disadvantage is that the quality of the image is slightly reduced in so far as the image appears slightly granular.

A second possible solution involves applying noise-shaping techniques, taking into account during quantization the previous quantization error. The disadvantage of this solution lies in the fact that the complexity of the quantizer increases (albeit slightly).

A particularly advantageous solution involves envisaging for the uniform areas (i.e., the areas with E=0) the finest possible quantization with the minimum quantization step (Q=1).

For instance, developing the example seen previously (passage from RGB to modified YCbCr), for each pair $<c_1, c_2>$, if $c_1 = c_2 = c$ (8 bits), then the sequence of bits "1" plus 8 bits for c is sent; otherwise, if c1 is other than c2, the sequence of bits "0" plus 8 bits corresponding to the index VQ $(c_1 c_2)$ is sent. In all, we pass from the 16 bits of the pair $<c_1, c_2>$ to 8 bits.

The above solution falls, of course, within the vector quantizer scheme outlined previously. In fact, setting the quantization step to the minimum (Q=1) for the uniform areas (where E=0) means that the reconstruction points of the vector quantizer, in addition to being concentrated near the n-dimensional diagonal, are also located on the diagonal itself. This is important for preventing visible colored patterns.

The above patterns belong, moreover, to the category of artifacts for which the standard measurements of quality (such as the PSNR factor) do not correspond to the perceived quality. In fact, standard measurements of quality are based upon the intensity of the artifact and do not take into account the influence thereof on the visual system. In the present case, the patterns in question have a low intensity but, since they are regular, they may appear clearly visible and hence perceivable by the user.

The vector-quantization or multidimensional-quantization operation described herein involves passing from the binary representation of the intensity of the pixels contained in the block to the binary code assigned to the reconstruction point of the cell selected according to the pixels themselves.

From another point of view, it may be stated, with substantial adherence to the actual situation, that the block of pixels is encoded as a sort of single "superpixel" having an intensity specified by the binary code associated to the selected reconstruction point.

Experimentally, a residual statistical redundancy of the data is found, which can be further reduced in a lossy way by applying once again the solution presented herein or else in a lossless way by concatenating one of the entropic-compression methods already presented.

The efficiency of the iterated lossy compression basically depends upon the way in which the binary codes are assigned to each reconstruction point. In particular, considering two reconstruction points, the assignment must be made in such a way that corresponding to a smaller distance in the n-dimensional space there will be a smaller difference in the related binary values. Assuming that such an assignment has been carried out, it is understandable that a superpixel has a value similar to that of the adjacent ones, precisely on account of the residual statistical redundancy. The superpixels can therefore be introduced in multi-dimensional and quantized vectors with a procedure similar to the one already illustrated.

With reference once again to the example of the Bayer pattern, in the case of multiplexed chromatic components we pass from a Bayer pattern to a super Bayer pattern. In fact, each 4×2 block of the starting Bayer block (row $1=G_1R_1G_2R_3$, row $2=B_1G_3B_2G_4$) is encoded in a 2×2 superpixel block (row 1=G'R*, row 2=B*G"), by means of the two-dimensional vector quantization (R*=VQ<$R_1$, $R_2$>, B*=VQ<$B_1$, $B_2$>, G'=VQ<$G_1$, $G_2$>, RG"=VQ<$G_3$, $G_4$>).

There is the evident possibility of iterating the method on the super Bayer pattern thus obtained. From the point of view of vector quantization, this means increasing the size of the vector quantizer, since operation is carried out on blocks which refer to increasingly larger portions of the original data array.

It is moreover evident that it is possible to iterate the compression also in the case of the modified YCbCr.

To attain a further reduction of the residual statistical redundancy it is possible to resort to an entropic encoding.

By way of example, the simplest method involves identifying adjacent superpixels with the same value. This sequence of superpixels is then reduced to a single sample of the superpixel, preceded or followed by a count indicating the number of repetitions. It is, in other words, an application of the technique known as run-length encoding (RLE).

The application of more advanced methods is more effective with an appropriate assignment of the binary codes and the reconstruction points (block 26 of FIG. 2). In particular, optimal assignment of the codes follows the rule already illustrated previously.

Taking two reconstruction points, the assignment must be performed so that corresponding to a smaller distance in the n-dimensional space will be a smaller difference of the corresponding binary values.

Assuming that such an assignment has been made, it may be appreciated that the value of a superpixel can be predicted according to the value of the adjacent superpixels. In the simplest case, the value of the superpixel is predicted according to the value of the preceding one. The prediction error is then encoded with a technique which can basically be identified as a DPCM technique to which the diagrams of FIGS. 1 and 2 refer.

At a distance from the edges (and, consequently, probably for the majority of the superpixels), the prediction error is small. Small values of this error can then be classified with short binary codes, whereas large values will have long binary codes, in a way similar to what has been seen in relation to Huffmann compression.

Of course, in the case of multiplexed chromatic components, the simplest prediction of a given superpixel is made on the basis of the value of the nearest superpixel belonging to the same chromatic component.

In more complex cases, instead, the prediction of a chromatic component can be made on the basis of adjacent superpixels belonging to another chromatic component (as is normally the case in the methods of chromatic interpolation).

For example, in the particular case where the encoded data are in the Bayer format, a slight modification in the prediction scheme of a DPCM type enables improvement of performance in the case of encoding of the green component.

In a Bayer pattern, in fact, the green pixels are present on each row, whilst the blue and the red ones are distributed on alternate rows. Consequently, the fact that continuous green pixels belonging to successive rows are nearer in space than adjacent pixels on the same row results in a higher correlation, which, in turn, involves lower prediction errors, at least in the case of areas of images in which sharp edges are not present.

A prediction scheme following a "zigzag" order, in the calculation of the errors, enables a slightly better compression as compared with the classic scheme, both in the case of lossless compression and in the case of lossy compression.

The degree of such an improvement (to which FIG. 3 makes specific reference) depends upon the characteristics of the image and increases as the resolution increases.

Table 1 appearing below gives the mean results obtained on databases of images in Bayer pattern, which have different resolutions and are compressed using both the adaptive DPCM-type approach, which has just been described (I-DPCM), and the classic approach (Standard DPCM or std DPCM).

| Resolution | algorithm | Bit rate compression performance (expressed in bpp) | | | | | | |
|---|---|---|---|---|---|---|---|---|
| | | lossless | q = 2 | q = 4 | Q = 8 | q = 16 | q = 24 | q = 32 |
| 352 × 288 | std DPCM | 4.79 | 3.83 | 2.96 | 2.19 | 1.65 | 1.45 | 1.33 |
| | I-DPCM | 4.67 | 3.73 | 2.85 | 2.10 | 1.58 | 1.40 | 1.29 |
| 640 × 480 | std DPCM | 4.96 | 4.04 | 3.14 | 2.39 | 1.81 | 1.57 | 1.43 |
| | I-DPCM | 4.87 | 3.95 | 3.06 | 2.31 | 1.71 | 1.54 | 1.40 |
| 1000 × 800 | std DPCM | 3.57 | 2.74 | 2.07 | 1.62 | 1.34 | 1.24 | 1.18 |
| | I-DPCM | 3.44 | 2.62 | 1.98 | 1.55 | 1.30 | 1.21 | 1.15 |

In the table, the value q designates the step used in the lossy compression obtained via uniform quantization.

Concatenating the lossless DPCM encoding system to the approach based upon vector quantization, it is possible to obtain a better compression without any loss in quality of the output.

Although the vector quantizer operates satisfactorily with any type of image from the perceptive point of view (subjective quality evaluation), it is possible to improve the objective performance thereof (for instance, in terms of peak signal-to-noise ratio or PSNR) in the case of images with sharp edges: a typical example is represented by images created artificially on the computer, cartoons, text pages introduced via scanner or other means.

To obtain this improvement, the function that calculates the quantization step Q according to the sharpness of the edge E and of the mean level of brightness M is modified. In particular, Q is chosen small when E is maximum (sharp edge). In practice, Q is not simply made to increase with E and M as seen previously but Q reaches a maximum at an intermediate value of E.

This means that the reconstruction points of the quantization lattice are arranged in the corners far away from the multi-dimensional diagonal. These corners belong to the multi-dimensional cube, in which the vector that corresponds to the n-tuple of co-ordinates corresponding to the pixels in the block comes to be located.

Alternatively (and in addition to the strategy just illustrated for the calculation of Q), it is possible to cause Q to be small when one of the pixels in the block has the maximum or minimum allowable value. This means that the reconstruction points of the quantization lattice are set not only on the corners distant from the multi-dimensional diagonal, but also along the sides of the multi-dimensional cube in which there the vector that corresponds to the n-tuple of co-ordinates corresponding to the pixels in the block comes to be located.

The graphs of FIGS. 4a to 4f reproduce examples of reconstruction-point lattices and quantization cells for two-dimensional vector quantizers. In particular, the graphs in question (the scales of which, both on the abscissa and on the ordinate, are of themselves irrelevant) refer respectively to a square lattice (FIGS. 4a, 4b) and to a hexagonal lattice (FIG. 4c).

FIGS. 4d, 4e and 4f refer, instead, to error values found respectively with a Q scalar quantizer, a Q vector quantizer and an optimal Q vector quantizer.

The images of FIGS. 5a to 5d are demonstrate the performance of a generic two-dimensional vector quantizer applied to 2×1 blocks of an array containing luminance (compression factor 50%, from 8 bpp to 4 bpp) as compared with a scalar quantizer.

Figure 5:
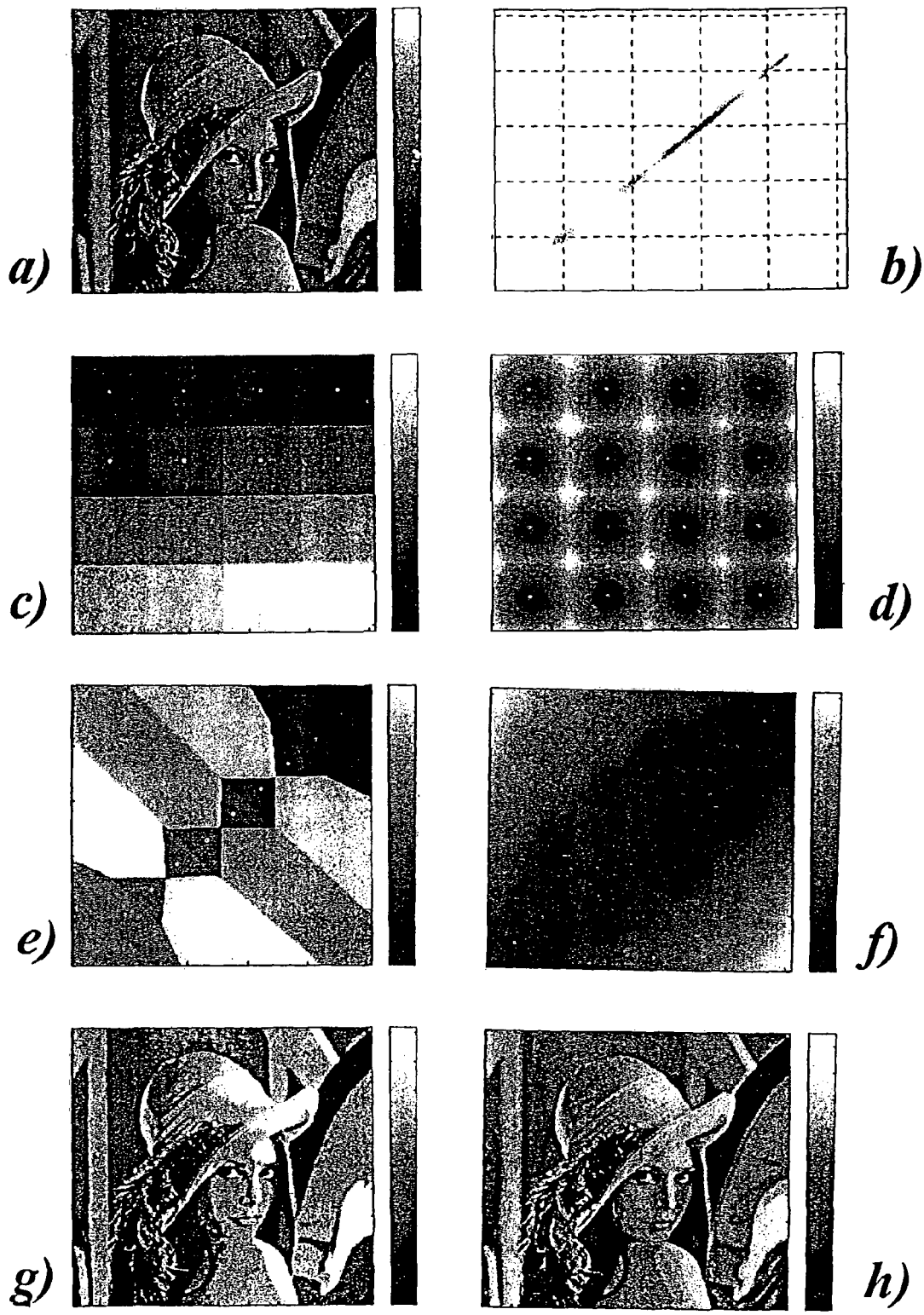

In particular, FIG. 5a illustrates an 8-bit/pixel image, whilst FIG. 5b shows the 2Q statistics for a 2×1 block.

FIG. 5c illustrates the distribution of the cells of the reconstruction points, whereas FIG. 5d illustrates the map of the quantization error.

FIGS. 5e and 5f reproduce the cells and the reconstruction points, as well as the quantization error with reference to FIGS. 5g and 5h, which reproduce images on four bits per pixel obtained after quantization with uniform 2Q quantizer and non-uniform 2Q quantizer.

FIGS. 6a to 6l demonstrate the performance of a two-dimensional vector quantizer built according to the modalities described previously and applied to 4×2 blocks of an array containing chromatic components multiplexed according to the Bayer pattern (compression factor 56%, from 8 bpp to 4.5 bpp) as compared with a scalar quantizer and a vector quantizer without points along the multi-dimensional diagonal.

Figure 6:
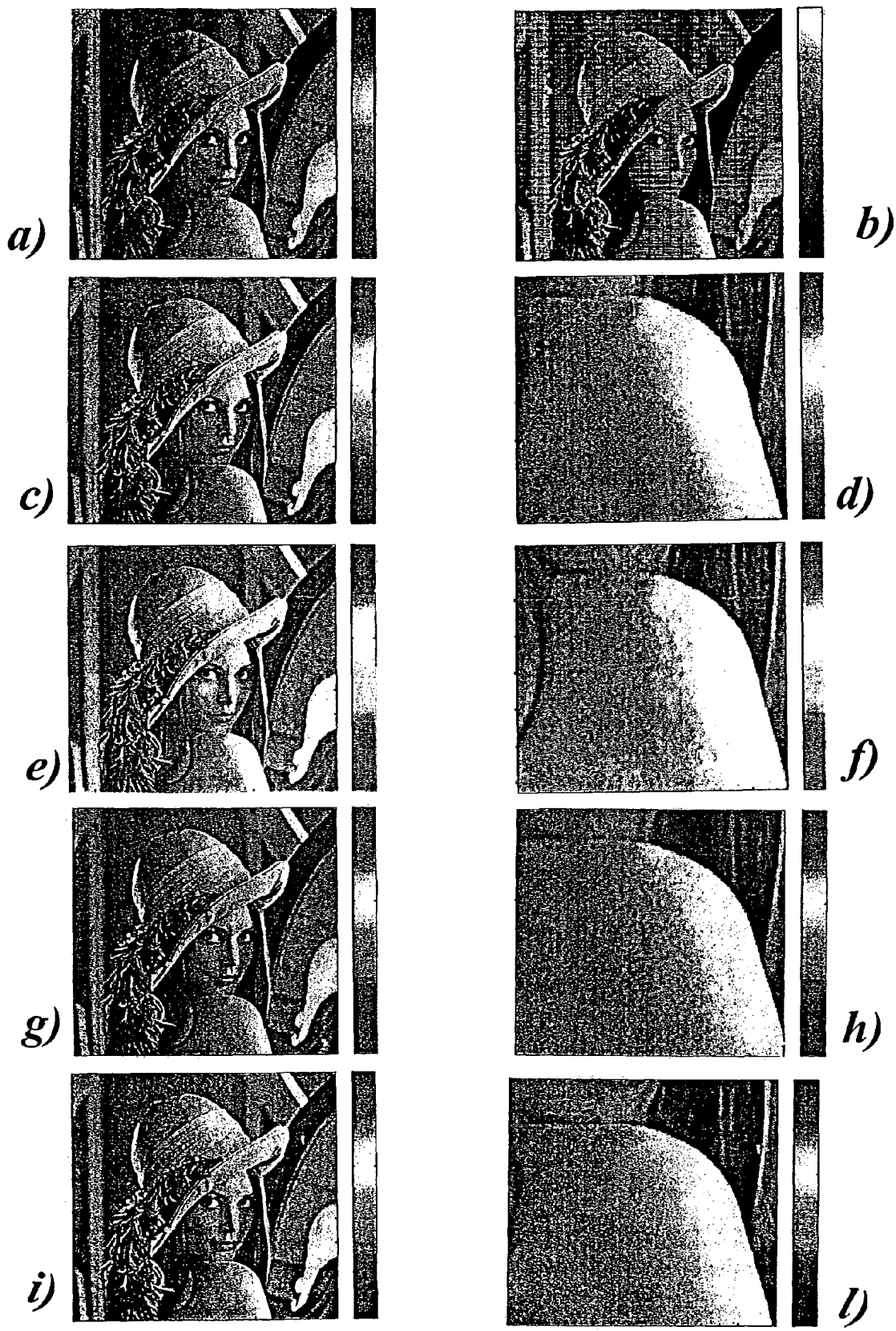

In particular, it is assumed that the starting point is a 24-bit/pixel RGB image (FIG. 6a), to which there corresponds the Bayer pattern on 8 bits/pixel reproduced in FIG. 6b.

FIG. 6c illustrates the RGB image reconstructed from the Bayer pattern, and FIG. 6d reproduces a part of the same image at an enlarged scale.

FIGS. 6e and 6f illustrate, by way of comparison, the RGB image reconstructed from a Bayer pattern compressed with a scalar quantizer, whereas FIGS. 6g and 6h refer to the RGB image reconstructed from a Bayer pattern compressed with a vector quantizer.

FIGS. 6i and 6l refer to an RGB image reconstructed from a Bayer pattern compressed with an optimal vector quantizer.

Figure 7:
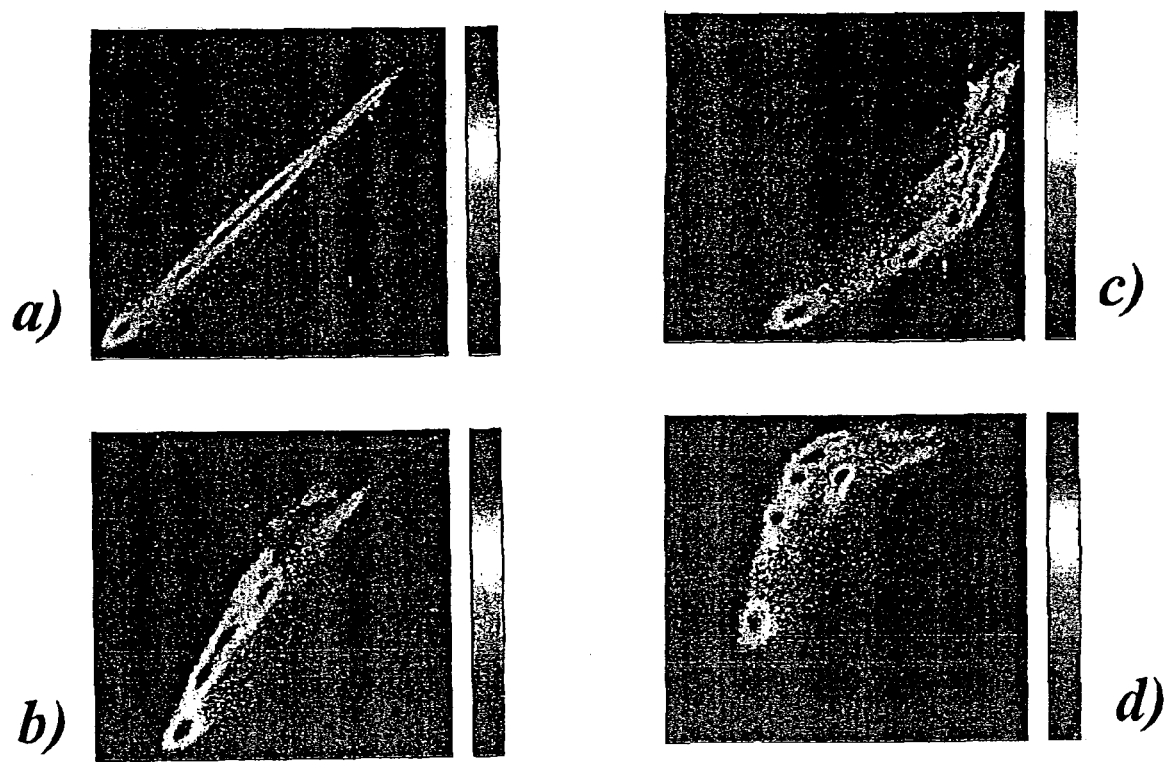

FIG. 7a shows the strong correlation between the $G_1$ (abscissa) component and the $G_2$ (ordinate) component of the Bayer pattern. It is observed that the $<G_1, G_1>$ pair is set along the two-dimensional diagonal of the quantization space and is quantized with a small quantization error.

It appears clearly, instead, that this does not occur for the $<G, R>$ pair (FIG. 7b), for the $<G, B>$ pair (FIG. 7c) and for the $<R, B>$ pair (FIG. 7d). For these pairs, the result of the perceptive vector quantization would therefore be affected by a larger quantization error.

It is emphasized that, also in relation to FIGS. 7a to 7d, as for FIGS. 4a-f, 5a-5h, and 6a-6l, the exact definition of the scales is not in itself relevant.

In one embodiment, an article of manufacture is provided. The article of manufacture comprises a machine-readable medium having instructions stored thereon to: convert a digital video signal organized in blocks of pixels from a first format to a second format, including instructions to use vector quantization to compress the first format into the second format; and to obtain the vector quantization, repeatedly apply a scalar quantizer to the pixels of the blocks with an adaptive quantization step based on characteristics of the pixels.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

Of course, without prejudice to the principle of the invention, the details of implementation and the embodiments may be amply varied with respect to what is described and illustrated herein, without thereby departing from the scope of the present invention, as defined in the claims that follow.

What is claimed is:

1. A process, comprising:
    converting digital video signals having images organized in blocks of pixels between a first format and a second format, said second format being a format compressed via vector quantization, said converting including:
    obtaining said vector quantization from repeated application of a scalar quantizer to the pixels of said blocks with a quantization step determined in an adaptive way according to characteristics of the pixels, wherein said obtaining said vector quantization includes:
        identifying a sharpness value of edges in each of said blocks of pixels, and quantizing said sharpness value to divide the edges into a number of classes; and
        attributing a value to said quantization step differentiated according to the classes, wherein the value of the quantization step is increased near the edges of said images having said pixels,
    wherein said video signals in said first format are signals generated according to a so-called Bayer pattern, which can be ordered in blocks of size 4×2 having the following pattern of chromatic components:
    row 1=$G_1R_1G_2R_2$,
    row 2=$B_1G_3B_2G_4$;

and wherein said vector quantization is a two-dimensional vector quantization applied to pairs <$R_1$, $R_2$>, <$B_1$, $B_2$> together with <$G_1$, $G_2$>, <$G_3$, $G_4$> or <$G_1$, $G_3$>, <$G_2$, $G_4$>.

2. The process according to claim 1 wherein said quantization step is determined so as to increase according to a lack of uniformity of the pixels in the block.

3. The process according to claim 2 wherein said quantization step is determined by a law increasing according to multiples.

4. The process according to claim 1 wherein said converting includes detecting a level brightness of pixels in a block and determining said quantization step in such a way that said quantization step increases as a function of said level of brightness.

5. The process according to claim 4 wherein detecting the level of brightness of the pixels in the block is carried out by detecting a mean level of brightness of the pixels in the block.

6. The process according to claim 4 wherein said converting includes:
dividing said level of brightness of the pixels in the block in a number of classes; and
selecting a value of said quantization step in a different way according to the classes thus determined.

7. The process according to claim 1 wherein said converting includes:
detecting a lack of uniformity of the pixels in a block;
detecting a level of brightness of the pixels in the block; and
determining said quantization step in such a way that said quantization step first increases and then decreases as a function of said lack of uniformity and said level of brightness.

8. The process according to claim 7 wherein said quantization step is made to increase and decrease by multiples or sub-multiples.

9. The process according to claim 1, wherein in passage from said first format to said second format, said digital video signals are subjected to at least one of the following:
sub-sampling;
low-pass filtering for anti-aliasing purposes before sub-sampling; and
multiplexing of at least one part of digital data necessary for representation of an image.

10. The process according to claim 9 wherein in said digital video signals in said second format, chrominance planes are sub-sampled according to a quincunx pattern.

11. The process according to claim 1 wherein the digital video signals include multiplexed chromatic components, wherein in passage from said first format to said second format, the process further comprising re-ordering the pixels in each block to be quantized by composing them in a vector such that the multiplexed chromatic components are quantized separately.

12. The process according to claim 1 wherein said converting includes identifying, in a context of said digital video signals, blocks of uniform pixels, choosing for said blocks of uniform pixels a minimum quantization step among quantization steps adopted in said vector quantization.

13. The process according to claim 1 wherein said digital video signals in said second format are expressed in a form of binary codes associated to respective quantized signals, the process further comprising executing a function of prediction of said binary codes.

14. The process according to claim 13 wherein said function of prediction of the binary codes is carried out according to a DPCM scheme.

15. The process according to claim 1 wherein in passage from said first format to said second format, the signal compressed via vector quantization is subjected to entropic encoding.

16. The process according to claim 15 wherein said entropic encoding is performed with a technique chosen from at least one of run-length encoding, Huffmann encoding, and arithmetic encoding.

17. The process according to claim 1 wherein said vector quantization is a multi-dimensional vector quantization resulting from concatenation of a plurality of vector quantizations, each resulting from repeated application of a scalar quantization.

18. The process according to claim 17 wherein for each of said concatenated vector quantizers, binary codes of reconstruction points are assigned in such a way that the reconstruction points with small distance in multi-dimensional space have binary codes with small difference.

19. The process according to claim 1 wherein said quantization step is determined according to at least one law chosen from the following:

$m^*E_Q+q$; and $m^*(t^\hat{}E_Q)+q$;

where m and q are constants, determined selectively, and $E_Q$ is an index which identifies said edge classes, and t is a scalar value.

20. The process according to claim 1 wherein said digital video signals in said first format are digital video signals in the RGB format and wherein said digital video signals in said second format are subjected to a change of co-ordinates to a color space chosen from at least one of YCbCr, YUV, UIQ, and YDbpr.

21. The process according to claim 1 wherein said vector quantization is applied to adjacent pairs of pixels in a luminance plane.

22. A process, comprising:
converting digital video signals having images organized in blocks of pixels between a first format and a second format, said second format being a format compressed via vector quantization, said converting including:
obtaining said vector quantization from repeated application of a scalar quantizer to the pixels of said blocks with a quantization step determined in an adaptive way according to characteristics of the pixels, wherein said obtaining said vector quantization includes:
identifying a sharpness value of edges in each of said blocks of pixels, and quantizing said sharpness value to divide the edges into a number of classes; and
attributing a value to said quantization step differentiated according to the classes, wherein the value of the quantization step is increased near the edges of said images having said pixels, wherein said vector quantization is obtained with application of two scalar quantizers with quantization steps scaled by constants ⅔ and sin ($\pi/3$).

23. The process according to claim 22 wherein said converting includes defining points of reconstruction allowed so that these points will form a hexagonal lattice.

24. A system for converting digital video signals having images organized in blocks of pixels between a first format and a second format, said second format being a format compressed via vector quantization, the system comprising:
at least one converter chosen between an encoder and a decoder and wherein said converter is configured for a vector quantization resulting from repeated application of a scalar quantizer to the pixels of said blocks with a quantization step determined in an adaptive way according to characteristics of the pixels, wherein said converter is configured to:
identify a sharpness value of edges in each of said blocks of pixels, and quantize said sharpness value to divide the edges into a number of classes; and
attribute a value to said quantization step differentiated according to the classes, wherein the value of the quantization step is increased near the edges of said images having said pixels,
wherein said quantization step is determined according to at least one law chosen from the following:

$m*E_Q+q$; and $m*(t\hat{}E_Q)+q$;

where m and g are constants, determined selectively, and $E_Q$ is an index which identifies said edge classes, and t is a scalar value.

25. The system according to claim 24 wherein said converter is configured to determine said quantization step in such a way that said quantization step increases according to a lack of uniformity of the pixels in a block.

26. The system according to claim 25 wherein said converter is configured to determine said quantization step by a law increasing according to multiples.

27. The system according to claim 24 wherein said converter is configured to detect a level of brightness of pixels in a block and determine said quantization step in such a way that said quantization step grows as a function of said level of brightness.

28. The system according to claim 27 wherein said converter is configured to detect a level of brightness of the pixels in the block by detecting a mean level of brightness of the pixels in the block.

29. The system according to claim 27 wherein said converter is configured to:
divide said level of brightness of the pixels in the block into a number of classes; and
select a value of said quantization step in a differentiated way according to the classes thus determined.

30. The system according to claim 24 wherein said converter is configured to:
detect a lack of uniformity of the pixels in a block;
detect a level of brightness of the pixels in the block; and
determine said quantization step in such a way that said quantization step first increases and then decreases as a function of said lack of uniformity and said level of brightness.

31. The system according to claim 30 wherein said converter is configured to increase and decrease said quantization step by multiples or sub-multiples.

32. The system according to claim 24 wherein said converter is an encoder configured to subject said digital video signals to at least one operation chosen from:
sub-sampling;
low-pass filtering for anti-aliasing purposes before sub-sampling; and
multiplexing of at least one part of digital data necessary for representation of an image.

33. The system according to claim 24 wherein the digital video signals comprise multiplexed chromatic components, wherein said encoder is configured to re-order the pixels in each block to be quantized by composing them in a vector such that the multiplexed chromatic components are quantized separately.

34. The system according to claim 24 wherein said encoder is configured to identify, in a context of said digital video signals, blocks of uniform pixels and to choose for said blocks of uniform pixels a minimum quantization step among quantization steps adopted in said vector quantization.

35. The system according to claim 24 wherein said converter is configured in such a way that said digital video signals in said second format are expressed in a form of binary codes associated to respective quantized signals and wherein said converter is configured to execute a function of prediction of said binary codes.

36. The system according to claim 35 wherein said function of prediction of the binary codes is carried out according to a DPCM scheme.

37. The system according to claim 24 wherein said converter is configured to subject the signals converted from said first format to said second format to a function of entropic encoding or decoding.

38. The system according to claim 37 wherein said entropic encoding is performed with a technique chosen from at least one of: run-length encoding, Huffmann encoding, and arithmetic encoding.

39. The system according to claim 24 wherein said converter is configured for a vector quantization having a multi-dimensional vector quantization resulting from concatenation of a plurality of vector quantizations, each resulting from repeated application of a scalar quantization.

40. The system according to claim 39 wherein said converter is configured to assign binary codes of reconstruction points for each of said concatenated vector quantizations in such a way that the reconstruction points with small distance in a multi-dimensional space have binary codes with small difference.

41. The system according to claim 24 wherein said digital video signals in said first format are digital video signals in an RGB format and wherein said digital video signals in said second format are subjected to a change of co-ordinates to a color space chosen from at least one of YCbCr, YUV, UIQ, and YDbDr.

42. The system according to claim 24 wherein said vector quantizer is applied to adjacent pairs of pixels in a luminance plane.

43. The system according to claim 24 wherein in said digital video signals in said second format, chrominance planes are sub-sampled according to a quincuncial pattern.

44. A system for converting digital video signals having images organized in blocks of pixels between a first format and a second format, said second format being a format compressed via vector quantization, the system comprising:
at least one converter chosen between an encoder and a decoder and wherein said converter is configured for a vector quantization resulting from repeated application of a scalar quantizer to the pixels of said blocks with a quantization step determined in an adaptive way according to characteristics of the pixels, wherein said converter is configured to:
identify a sharpness value of edges in each of said blocks of pixels, and quantize said sharpness value to divide the edges into a number of classes; and
attribute a value to said quantization step differentiated according to the classes, wherein the value of the quantization step is increased near the edges of said images having said pixels, wherein said converter is configured to obtain an application of two scalar quantizers with quantization steps scaled by constants ⅔ and $\sin(\pi/3)$.

45. The system according to claim 44 wherein said converter is configured to define points of reconstruction allowed so that these points will form a hexagonal lattice.

46. A system for converting digital video signals having images organized in blocks of pixels between a first format and a second format, said second format being a format compressed via vector quantization, the system comprising:
at least one converter chosen between an encoder and a decoder and wherein said converter is configured for a vector quantization resulting from repeated application of a scalar quantizer to the pixels of said blocks with a quantization step determined in an adaptive way according to characteristics of the pixels, wherein said converter is configured to:
identify a sharpness value of edges in each of said blocks of pixels, and quantize said sharpness value to divide the edges into a number of classes; and
attribute a value to said quantization step differentiated according to the classes, wherein the value of the quantization step is increased near the edges of said images having said pixels, wherein said video signals in said first format are signals generated according to a so-called Bayer pattern, which can be ordered in blocks of size 4×2 having the following pattern of chromatic components:
row 1=$G_1R_1G_2R_2$
row 2=$B_1G_3B_2G_4$
and wherein said vector quantization is a two-dimensional vector quantization applied to pairs <$R_1$, $R_2$>, <$B_1$, $B_2$> together with <$G_1$, $G_2$>, <$G_3$, $G_4$> or <$G_1$, $G_3$>, <$G_2$, $G_4$>.

47. An article of manufacture, comprising:
a computer-readable memory medium encoded with a computer program representing instructions to cause a processor, when the computer program is run, to:
convert a digital video signal having images organized in blocks of pixels from a first format to a second format, including instructions to use vector quantization to compress the first format into the second format, including instructions to cause said processor to obtain the vector quantization by repeatedly applying a scalar quantizer to the pixels of the blocks with an adaptive quantization step based on characteristics of the pixels, wherein the instructions to obtain the vector quantization include instructions to:
identify a sharpness value of edges in each of said blocks of pixels, and quantize said sharpness value to divide the edges into a number of classes; and
attribute a value to said quantization step differentiated according to the classes, wherein the value of the quantization step is increased near the edges of said images having said pixels,
wherein said video signals in said first format are signals generated according to a so-called Bayer pattern, which can be ordered in blocks of size 4×2 having the following pattern of chromatic components:
row 1=$G_1R_1G_2R_2$,
row 2=$B_1G_3B_2G_4$;
and wherein said vector quantization is a two-dimensional vector quantization applied to pairs <$R_1R_2$>, <$B_1$, $B_2$> together with <$G_1$, $G_2$>, <$G_3$, $G_4$> or <$G_1$, $G_3$>, <$G_2$, $G_4$>.

48. The article of manufacture of claim 47 wherein said instructions to convert include instructions to simultaneously reduce statistical and perceptive redundancy of data in the video signal.

49. The article of manufacture of claim 47 wherein said instructions to convert include instructions to change the quantization step based on at least one of lack of uniformity of pixels in a block and a level of brightness of the pixels in the block.

50. The article of manufacture of claim 47 wherein the video signals include multiplexed chromatic components, and wherein the computer-readable memory medium further includes instructions stored thereon to quantize the chromatic components separately.

51. The article of manufacture of claim 47 wherein said instructions to convert include instructions to concatenate a plurality of vector quantizations to obtain a multi-dimensional vector quantization, each of the vector quantizations resulting from repeated application of a scalar quantization.

52. A system, comprising:
a means for receiving a digital video signal organized into blocks of pixels at a first format and for outputting the digital video signal at a second format;
a means for encoding the digital video signal from the first format to the second format, said means for encoding including a means for performing vector quantization to compress the digital video signal at the first format into the second format using repeated application of a scalar quantizer to the pixels of the blocks with a quantization step adaptively determined based on characteristics of the pixels, the means for performing vector quantization including:
means for identifying a sharpness value of edges in each of said blocks of pixels, and quantizing said sharpness value to divide the edges into a number of classes; and
means for attributing a value to said quantization step differentiated according to the classes, wherein the value of the quantization step is increased near the edges of said images having said pixels,
wherein said quantization step is determined according to at least one law chosen from the following:

$m*E_Q+q$; and $m*(t^\wedge E_Q)+q$;

where m and q are constants, determined selectively, and $E_Q$ is an index which identifies said edge classes, and t is a scalar value.

53. The system of claim 52 wherein the means for adaptively determining the quantization step include a means for changing the quantization step based on at least one of lack of uniformity of pixels in a block, and a level of brightness of pixels in the block.

54. The system of claim 52 wherein said means for encoding includes a means for quantizing multiplexed chromatic components of the digital video signal separately.

55. The system of claim 52 wherein said means for encoding includes a means for executing a function of prediction of binary codes that are associated to respective quantized signals and that are used to express the digital video signals in the second format.

56. The system of claim 52 wherein the means for performing vector quantization include a means for concatenating a plurality of vector quantizations, each resulting from repeated application of a scalar quantization.

57. A process, comprising:
converting digital video signals having images organized in blocks of pixels between a first format and a second format, said second format being a format compressed via vector quantization, said converting including:
obtaining said vector quantization from repeated application of a scalar quantizer to the pixels of said blocks with a quantization step determined in an adaptive way according to characteristics of the pixels, wherein said obtaining said vector quantization includes:

identifying a sharpness value of edges in each of said blocks of pixels, and quantizing said sharpness value to divide the edges into a number of classes; and attributing a value to said quantization step differentiated according to the classes, wherein the value of the quantization step is increased near the edges of said images having said pixels, wherein said quantization step is determined according to at least one law chosen from the following:

$m*E_Q+q$; and $m*(t^{\wedge}E_Q)+q$;

where m and q are constants, determined selectively, and $E_Q$ is an index which identifies said edge classes, and t is a scalar value.

58. The process according to claim 57, wherein in passage from said first format to said second format, said digital video signals are subjected to at least one of the following:

sub-sampling;

low-pass filtering for anti-aliasing purposes before sub-sampling; and multiplexing of at least one part of digital data necessary for representation of an image.

59. The process according to claim 57 wherein said digital video signals in said second format are expressed in a form of binary codes associated to respective quantized signals, the process further comprising executing a function of prediction of said binary codes.

60. The process according to claim 57 wherein in passage from said first format to said second format, the signal compressed via vector quantization is subjected to entropic encoding.

61. The process according to claim 57 wherein said vector quantization is a multi-dimensional vector quantization resulting from concatenation of a plurality of vector quantizations, each resulting from repeated application of a scalar quantization.

* * * * *

UNITED STATES PATENT AND TRADEMARK OFFICE
CERTIFICATE OF CORRECTION

PATENT NO. : 7,742,521 B2
APPLICATION NO. : 10/674903
DATED : June 22, 2010
INVENTOR(S) : Andrea Lorenzo Vitali et al.

Page 1 of 1

It is certified that error appears in the above-identified patent and that said Letters Patent is hereby corrected as shown below:

Column 16
Line 33, claim 20 "and YDbpr." and should read as --and YDbDr--.

Column 17
Line 17, claim 24 "where m and g are constants, determined selectively, and" and should read as --where m and q are constants, determined selectively, and--.

Signed and Sealed this

Twenty-first Day of December, 2010

David J. Kappos
*Director of the United States Patent and Trademark Office*